United States Patent
Lewis et al.

(10) Patent No.: US 8,958,778 B2
(45) Date of Patent: Feb. 17, 2015

(54) SYSTEMS AND METHODS FOR LOCATION BASED SERVICES IN A MATCHING SERVICE

(71) Applicants: Ashley Lewis, Manhattan Beach, CA (US); Arvind Mishra, Encino, CA (US)

(72) Inventors: Ashley Lewis, Manhattan Beach, CA (US); Arvind Mishra, Encino, CA (US)

(73) Assignee: Eharmony, Inc., Santa Monica, CA (US)

( * ) Notice: Subject to any disclaimer, the term of this patent is extended or adjusted under 35 U.S.C. 154(b) by 42 days.

(21) Appl. No.: 13/802,188

(22) Filed: Mar. 13, 2013

(65) Prior Publication Data

US 2014/0273985 A1    Sep. 18, 2014

(51) Int. Cl.
*H04W 4/02*    (2009.01)

(52) U.S. Cl.
CPC ..................................... *H04W 4/02* (2013.01)
USPC ...................... 455/414.1; 455/456.1; 715/733

(58) Field of Classification Search
CPC ........... G08B 2001/085; H04W 4/021; H04W 4/028; H04W 4/043; H04W 4/206
USPC .................................. 455/414.1, 456.1, 456.2
See application file for complete search history.

(56) References Cited

U.S. PATENT DOCUMENTS

| 2012/0204112 A1* | 8/2012 | Levine et al. ................ 715/733 |
| 2013/0090130 A1* | 4/2013 | Burrell et al. ............... 455/456.1 |

* cited by examiner

*Primary Examiner* — Kashif Siddiqui
(74) *Attorney, Agent, or Firm* — One LLP

(57) ABSTRACT

The field of the invention relates to systems and methods for operation of an online matching service, and more particularly to systems and methods that provide matching services to the users of an online matching service based on the current geographic locations of the users. In a preferred embodiment, the system includes a matching system server coupled to a public network and accessible to one or more users. The matching system server includes a database that stores match profile data associated with the one or more users, wherein the match profile data includes self-identified preferences. The system is configured to identify compatible matches between users based at least in part of the users' location.

2 Claims, 12 Drawing Sheets

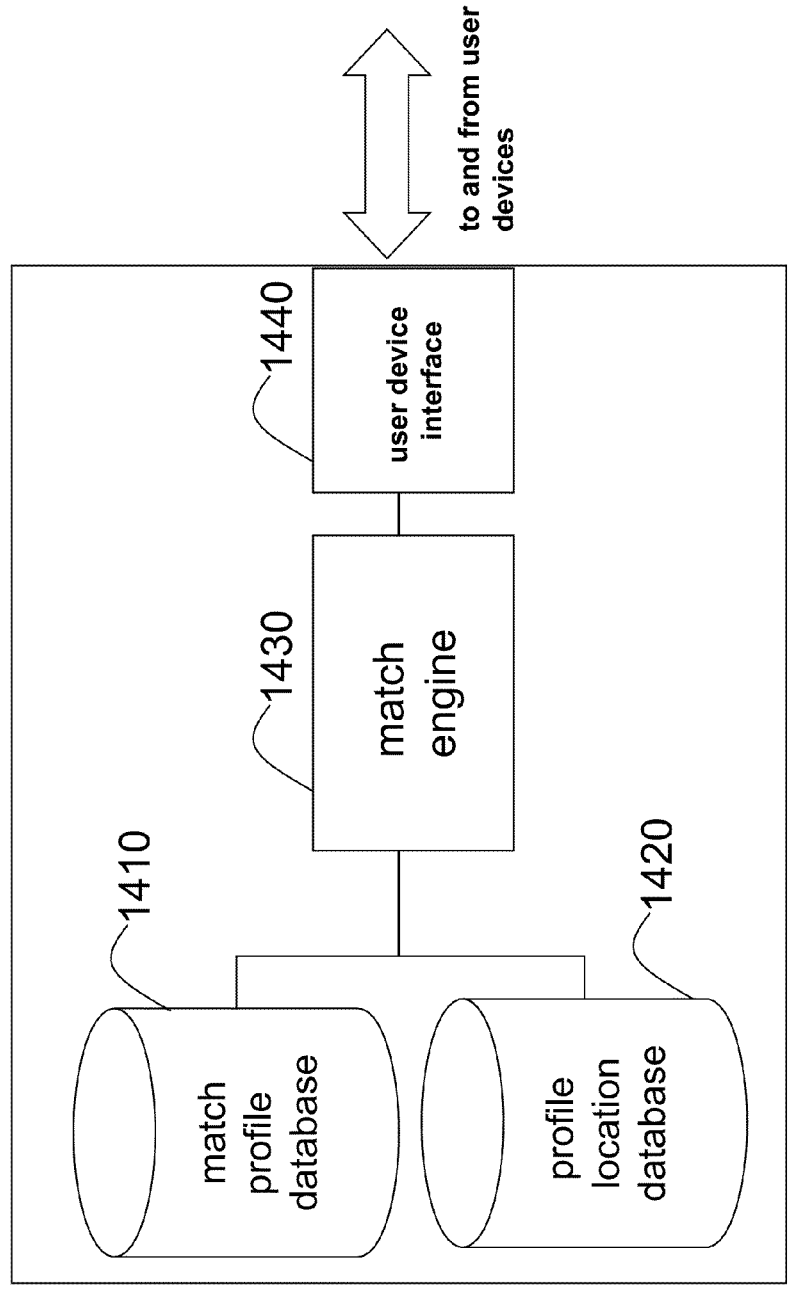

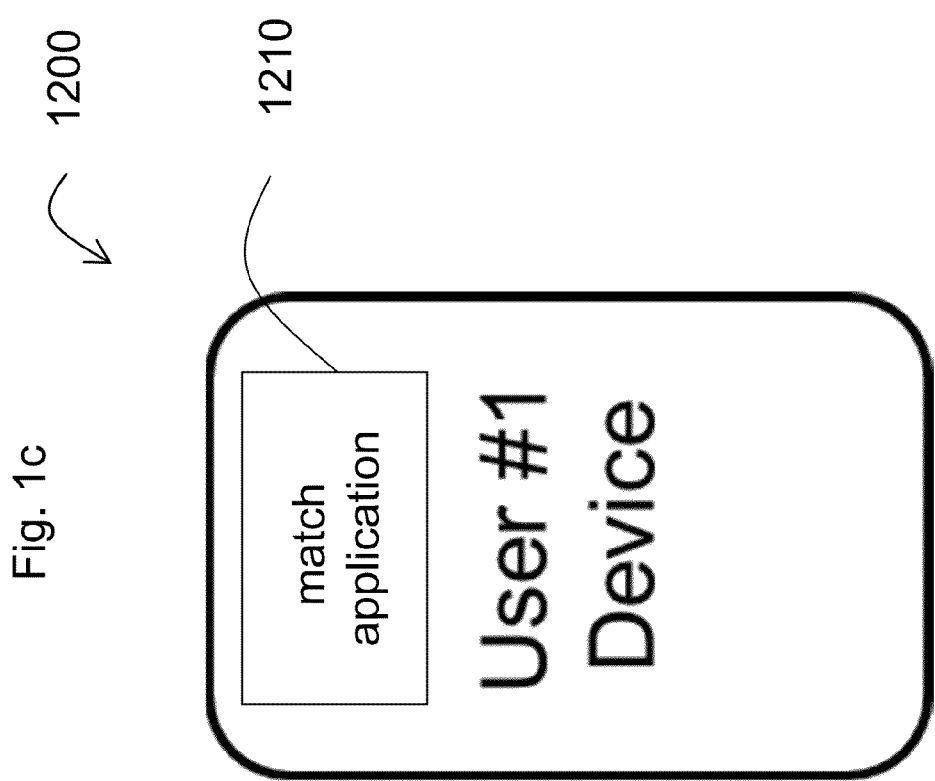

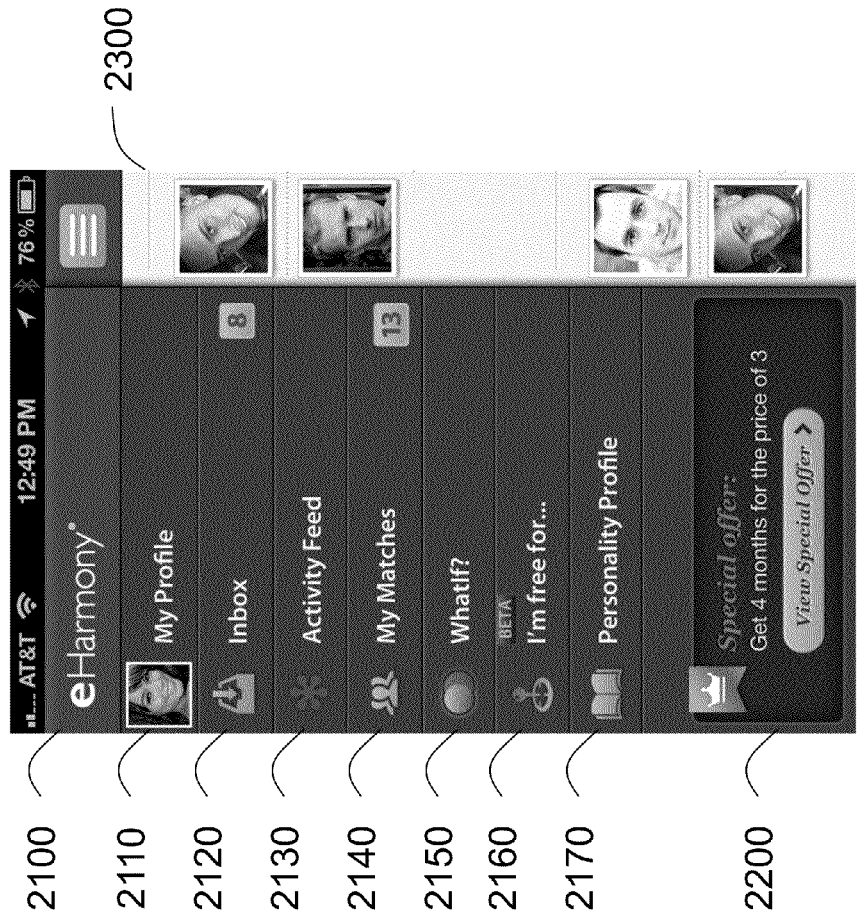

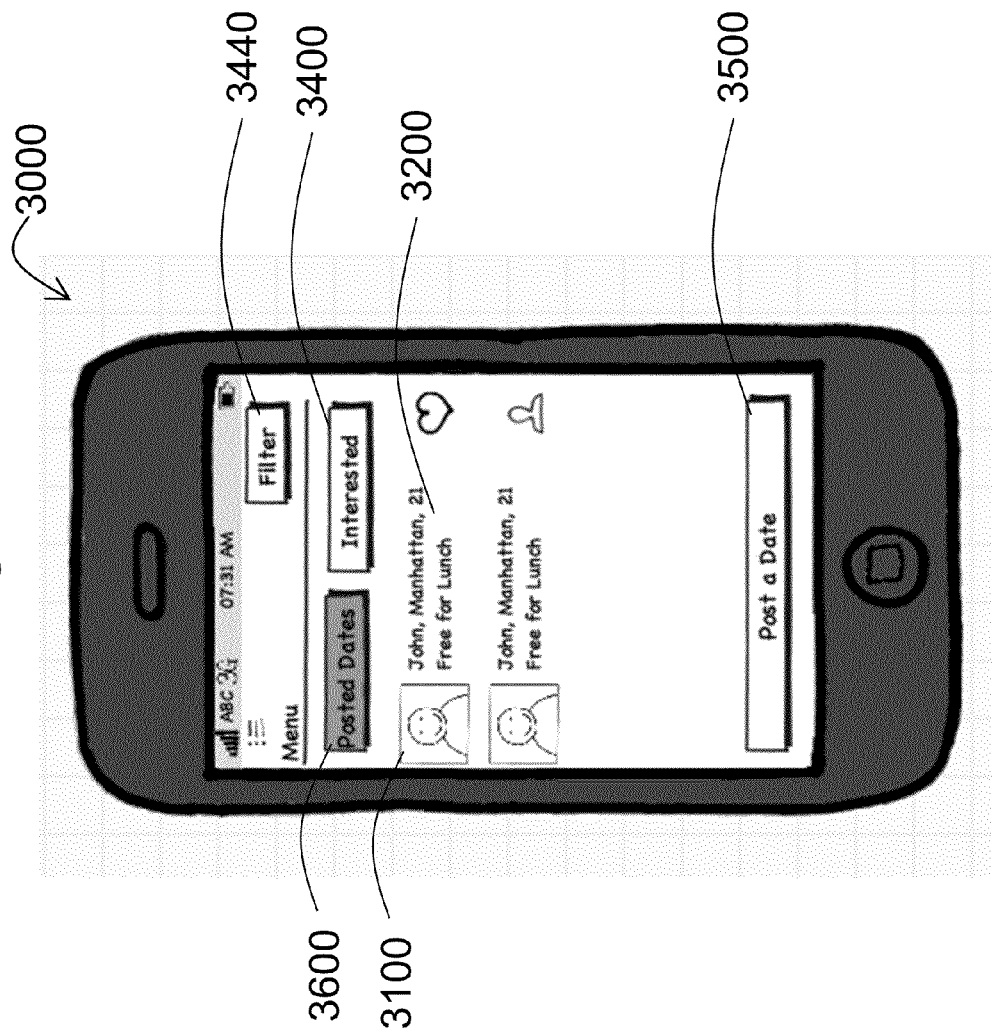

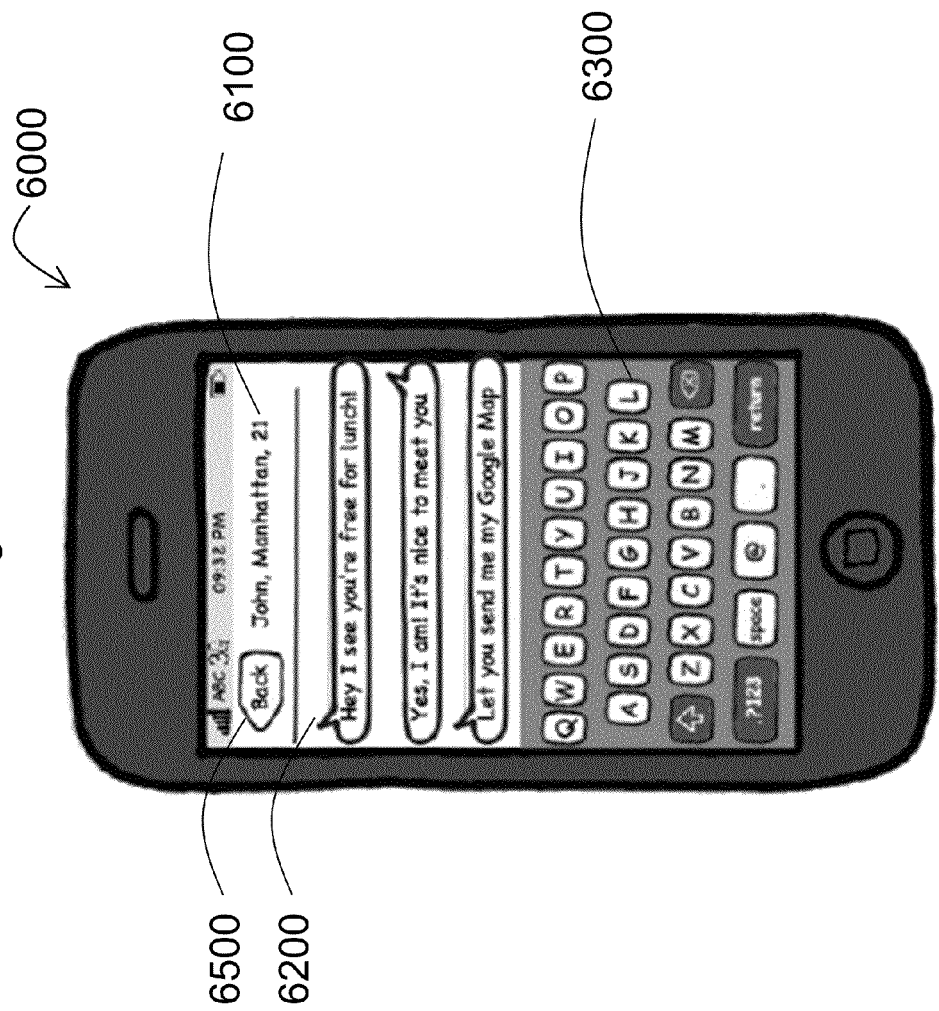

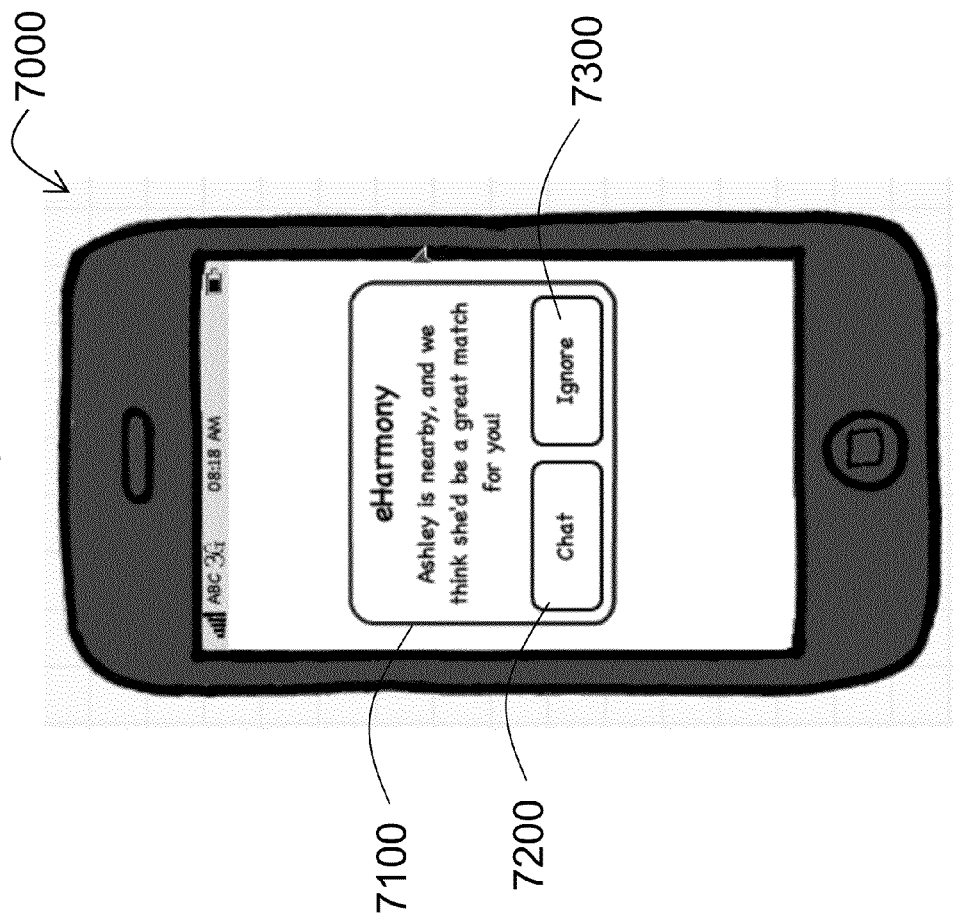

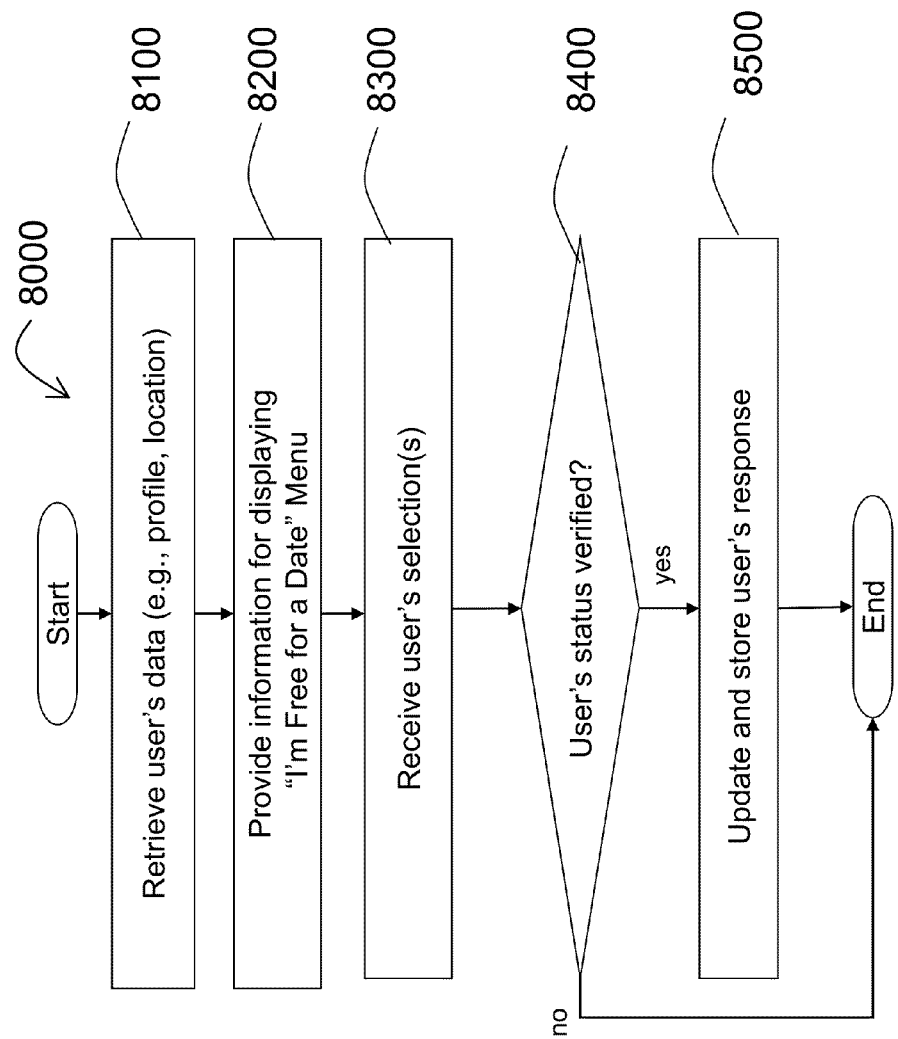

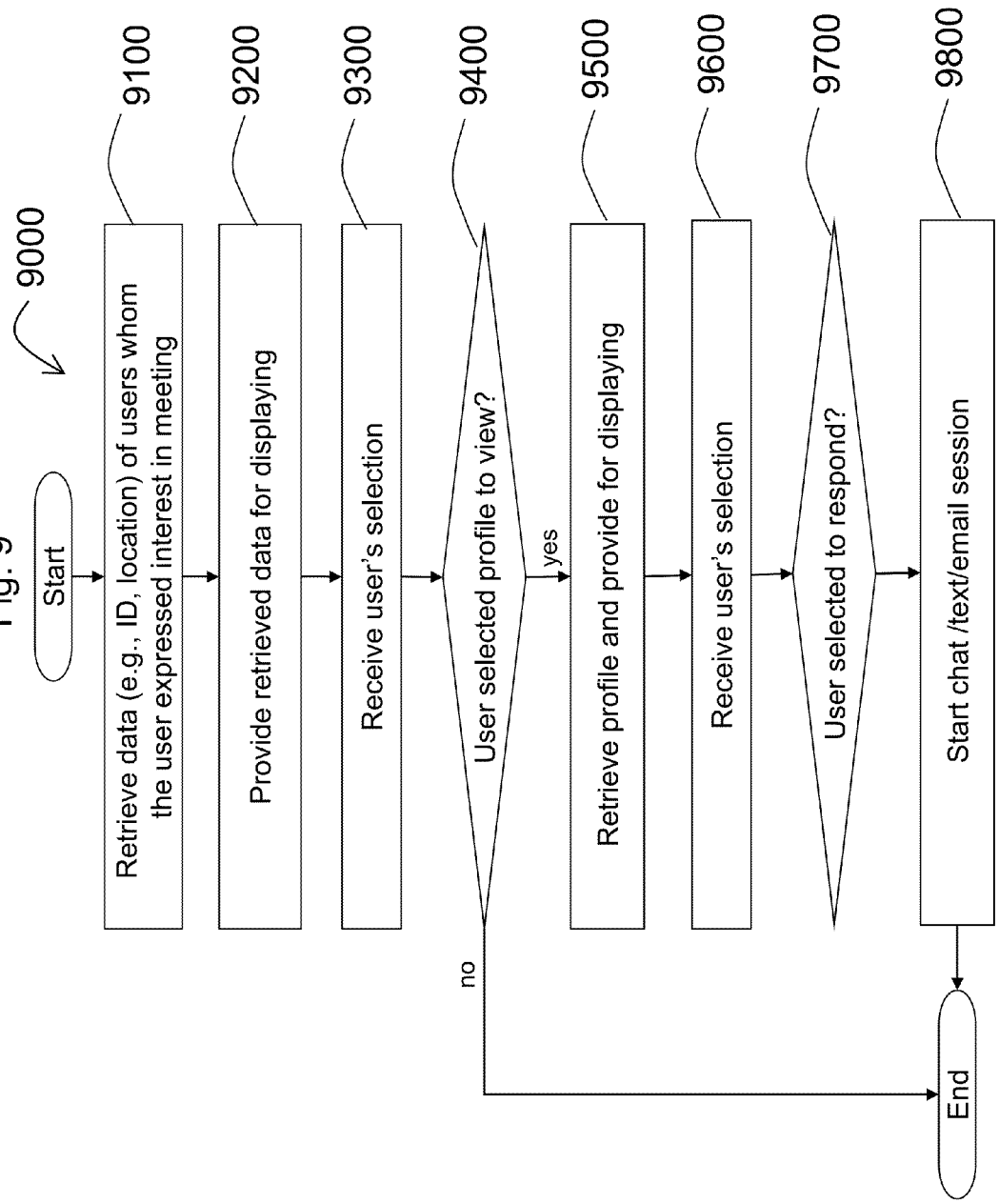

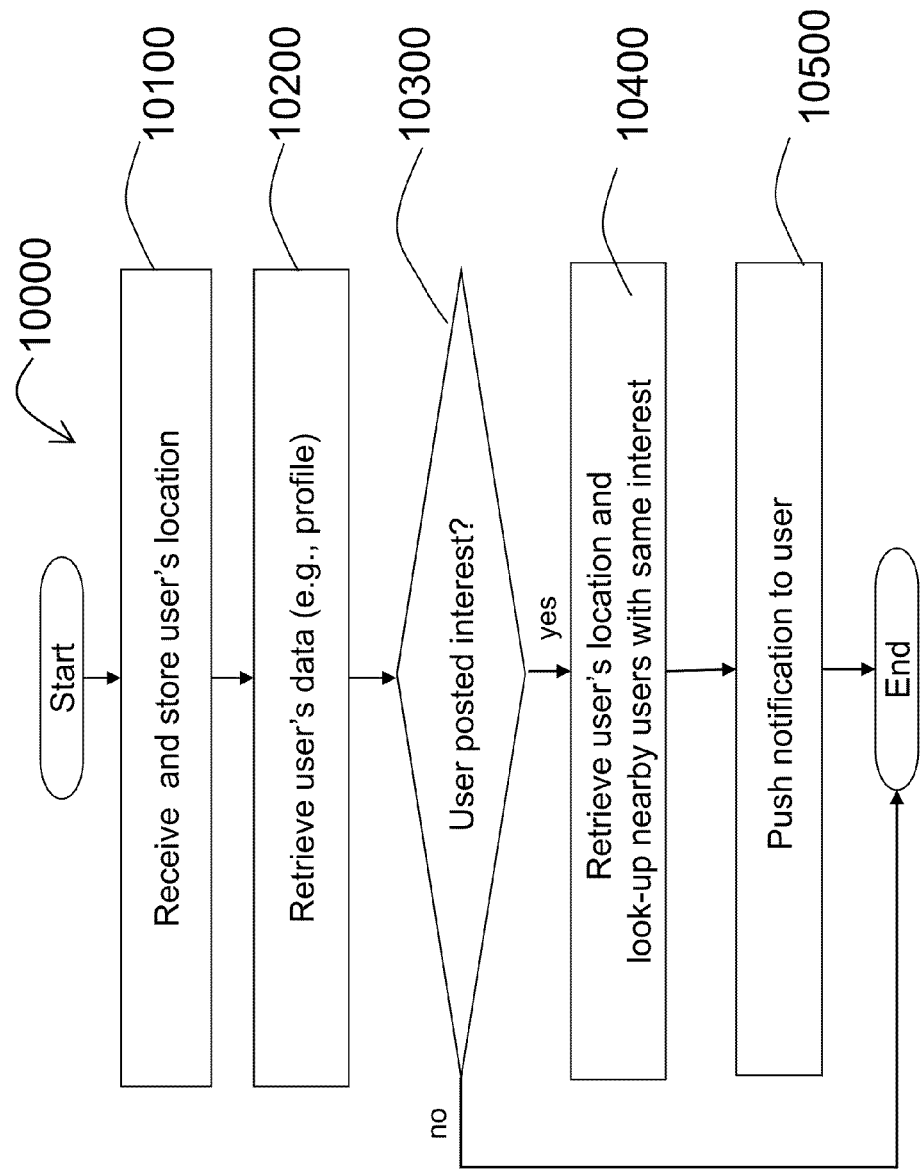

SYSTEMS AND METHODS FOR LOCATION BASED SERVICES IN A MATCHING SERVICE

FIELD OF THE INVENTION

The field of the invention relates to systems and methods for operation of a matching service, and more particularly to systems and methods that enable location based services in a matching service.

BACKGROUND OF THE INVENTION

One of the goals of matching services is to help their users achieve successful relationships with other users. Online matching services thus have developed effective systems that identify and match the users who have the potential to establish a successful relationship. A well-known example of such a service is eHarmony, Inc. (which can be found at www.eharmony.com). An online matching service generally collects and stores data to create a "profile" for each user. The online matching service then correlates that user's profile with others in its database to assess which profiles are compatible, i.e., which users have the potential for a successful relationship when matched, and which are not compatible. The online matching service then emails the compatible profiles to that user, or presents the compatible profiles to that user when that user accesses the online matching service.

With the proliferation of smart phones and portable devices, users of the online matching services have become more mobile. Many of the smart phones and portable devices provide the users with access to the wireless data services, which allow the users to access their email or their online matching services without having to be at home or in an office with Internet connection. In such instances, a user still needs to log into their accounts to review the compatible profiles. Further, the mobile users may want to know if any of their compatible profiles are currently nearby so they may initiate a meeting. The process of logging into the online matching service, reviewing the compatible profiles, and finding if any of the compatible profiles may be at a location at a certain time may be too time consuming and may discourage the mobile user from using the online matching service. It is also cumbersome, if not impossible, for the mobile users to log in and update their current and future locations all the time. As a result, information about geographic locations of the users and of their compatible profiles, especially those who are mobile, may either be non-existent or inaccurate.

In another example, the user of the online matching service may want to let other users of the service know that he is free to meet with other nearby users. If nearby users are not logged in to receive a notification that the user is free to meet, they will lose the chance to meet each other. Accordingly, systems and methods for allowing a user of an online matching service to announce his availability and for presenting to the user his compatible profiles based on the current geographic locations of the user and the compatible profiles may be desirable.

SUMMARY OF THE INVENTION

The field of the invention relates to systems and methods for operation of an online matching service, and more particularly to systems and methods that provide matching services to the users of an online matching service based on the current geographic locations of the users.

In a preferred embodiment, the system includes a matching system server coupled to a public network and accessible to one or more users. The matching system server includes a database that stores match profile data associated with the one or more users, wherein the match profile data includes self-identified preferences. The system is configured to identify compatible matches between users based at least in part on the users' location.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

In order to better appreciate how the above-recited and other advantages and objects of the inventions are obtained, a more particular description of the embodiments briefly described above will be rendered by reference to specific embodiments thereof, which are illustrated in the accompanying drawings. It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

FIG. 1b is an exemplary diagram of a matching server system in accordance with a preferred embodiment of the present invention;

FIG. 1c is an exemplary diagram of a user device in accordance with a preferred embodiment of the present invention;

FIG. 2 is an exemplary user interface in accordance with a preferred embodiment of the present invention;

FIG. 3 is an exemplary user interface of the "I'm Free for a Date" application in accordance with a preferred embodiment of the present invention;

FIG. 6 is an exemplary Chat user interface in accordance with a preferred embodiment of the present invention;

FIG. 7 is an exemplary user interface of the "Compatible Near Me" application in accordance with a preferred embodiment of the present invention;

FIG. 8 is an exemplary process of a matching system in accordance with a preferred embodiment of the present invention.

FIG. 9 is another exemplary process of a matching system in accordance with a preferred embodiment of the present invention.

FIG. 10 is another exemplary process of a matching system in accordance with a preferred embodiment of the present invention.

DETAILED DESCRIPTION OF THE PREFERRED EMBODIMENTS

Preferred Systems

Figure 1A:
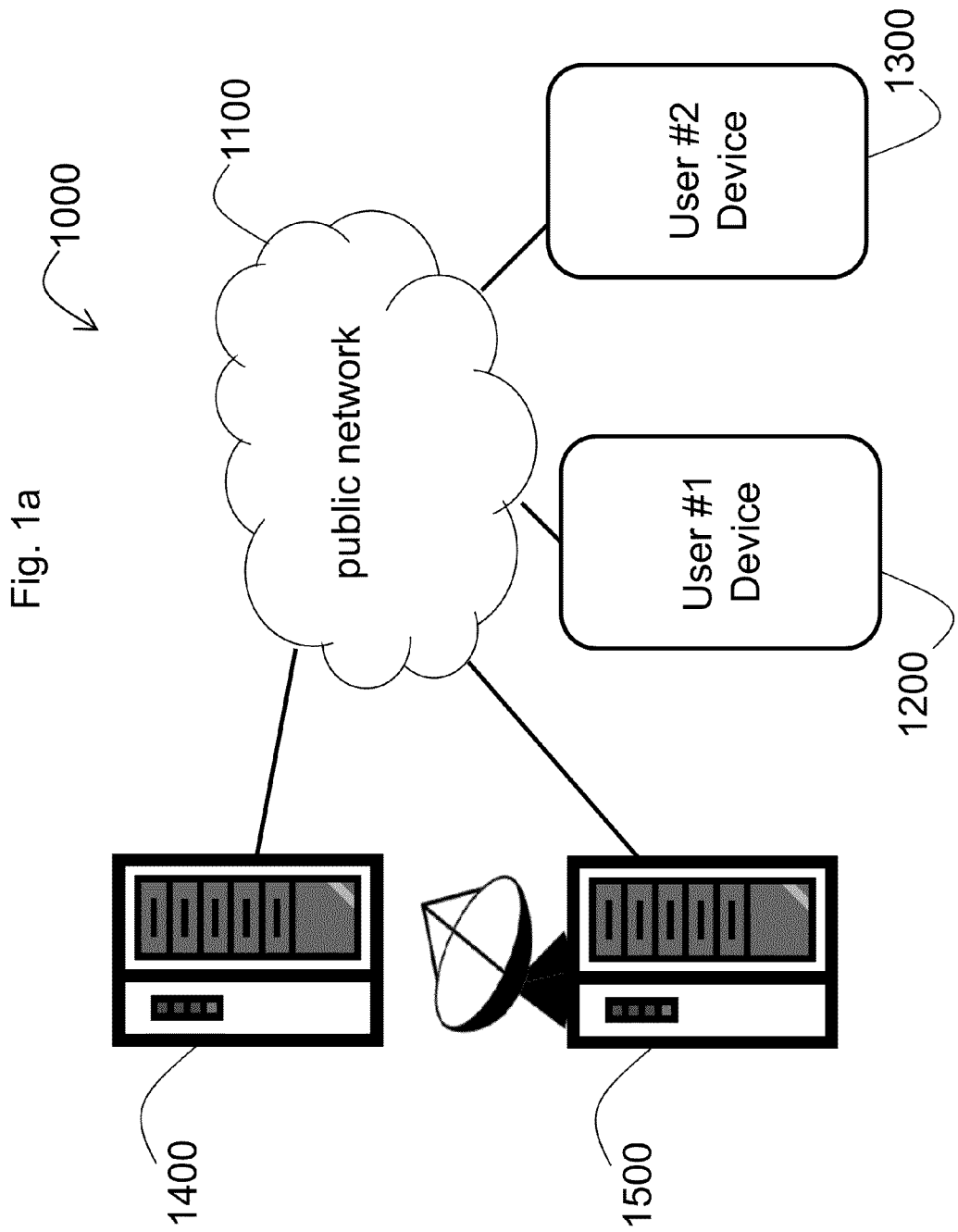
FIG. 1a is an exemplary diagram of an online interpersonal match system in accordance with a preferred embodiment of the present invention.

Turning to FIG. 1a, a computer-based compatibility matching system 1000 in accordance with a preferred embodiment of the present invention is shown. The system 1000 generally includes a matching server system 1400, which may be distributed on one or more physical servers, each having processor, memory, an operating system, and input/output interface, and a network interface all known in the art, and a plurality of end user computing devices 1200/1300 coupled to a public network 1100, such as the Internet and/or a cellular-based wireless network. The system 1000 may further include a location identification server 1500 (coupled to a global positioning system "GPS"), also operatively coupled to the public network 1100.

Turning to the matching server system 1400, an exemplary embodiment is shown in FIG. 1b. Generally, a matching server system 1400 includes a computer application designed to match users of the system 1400 who have the potential to establish a successful interpersonal relationship. To obtain potential matches, each user performs tasks suggested by the matching server system 1400. These tasks include, for example, establishing a "match profile" that includes data and factors potentially relevant to establishing a successful interpersonal relationship with that user, posting interests, making contacts with other users, and so on. Another exemplary task is to announce to other users that the user is currently free to meet, e.g., for a particular event, such as a lunch or dinner. The matching server system 1400 also operates to notify the user of compatible matches who are in close geographic proximity with the user and help the user to connect, e.g., chat or meet, with the users identified by the compatible matches. An exemplary approach to establishing a match profile for a user is described in detail in U.S. Pat. No. 7,454,357, issued to J. Galen Buckwalter et. al. on Nov. 18, 2008, which is hereby incorporated by reference in its entirety ("the Buckwalter patent").

These match profiles are stored in a match profile database 1410 and organized by the user's match profile identification ("ID"). In the process of creating potential matches for a particular user, a match engine 1430 queries the user's match profile by its respective ID, and correlates that profile with other profiles to calculate one or more compatibility values. If two profiles generate a compatibility value that meets a predefined threshold, then there is potential for the two respective users to have a satisfactory and/or successful interpersonal relationship if matched. Further detail of exemplary systems and processes can be found in the Buckwalter patent.

To notify a user of compatible matches who are in close geographic proximity with the user, the matching server system 1400 keeps location data in the profile location database 1420 which may be organized by profile identification. The location data may include, for example, the most current geographic location data of a user, which may be collected from the location identification server 1500 and/or from the user device 1200/1300. Alternatively, the match profile database 1410 and the profile location database 1420 may be the same database, or stored in the same database.

Turning to the user device 1200 (or 1300), an exemplary embodiment is shown in FIG. 1c. Generally, a matching application 1210 is downloaded to the user device 1200 by the user of the online matching service. The matching application 1210 is designed to operatively communicate with the matching server system 1400 over public network 1100. The user device 1200 may also include Global Positioning System (GPS) capability and functions, which may be operatively coupled to the location identification server 1500. When the user device 1200 has GPS capabilities and functions, the matching application 1210 is designed to retrieve or receive geographic location information of the user device 1200 from the GPS functions, e.g., via GPS satellites or the location identification server 1500. The matching application 1210 is further designed to receive geographic location information of the user device 1200 from input by the user, which may include current location and/or expected location at a future time, e.g., where the user expects to be the following week in the early evening. The matching application 1210 then communicates the geographic location information of the user device 1200 to the matching server system 1400.

Turning to FIG. 2, a user interface 2000 on a user device 1200/1300 in accordance with a preferred embodiment is shown. The user interface 2000 is part of the matching application 1210 on the user device 1200/1300, and configured to operatively communicate with the matching server system 1400 via the public network 1100. The user interface 2000 on a user device 1200/1300 is configured to present a first menu 2100. The first menu 2100 displays the functions and applications supported by the matching application 1210 and the online matching service. These functions and applications allow the user to, for example, view the user's profile ("My Profile" 2110), read messages in the user's inbox ("Inbox" 2120), view compatible matches ("My Matches" 2140), run the "I'm Free for a Date" application 2160, which initiates a location-based matching service, as will be described in more detail below, and so on. The user interface 2000 is also configured to display optional information, e.g., advertisement or product information, in panels 2200 and 2300.

Turning to FIG. 3, in accordance with a preferred embodiment, a user interface 3000 is displayed when the user selects (FIG. 2) to run the "I'm Free for a Date" application 2160. The "I'm Free for a Date" application 2160 is part of the matching application 1210. The "I'm Free for a Date" application 2160 enables the user to announce to other users of the online matching service that the user is, for example, free for lunch. If a user is interested in posting a date, the user would select the "Post a Date" button 3500.

Figure 4:
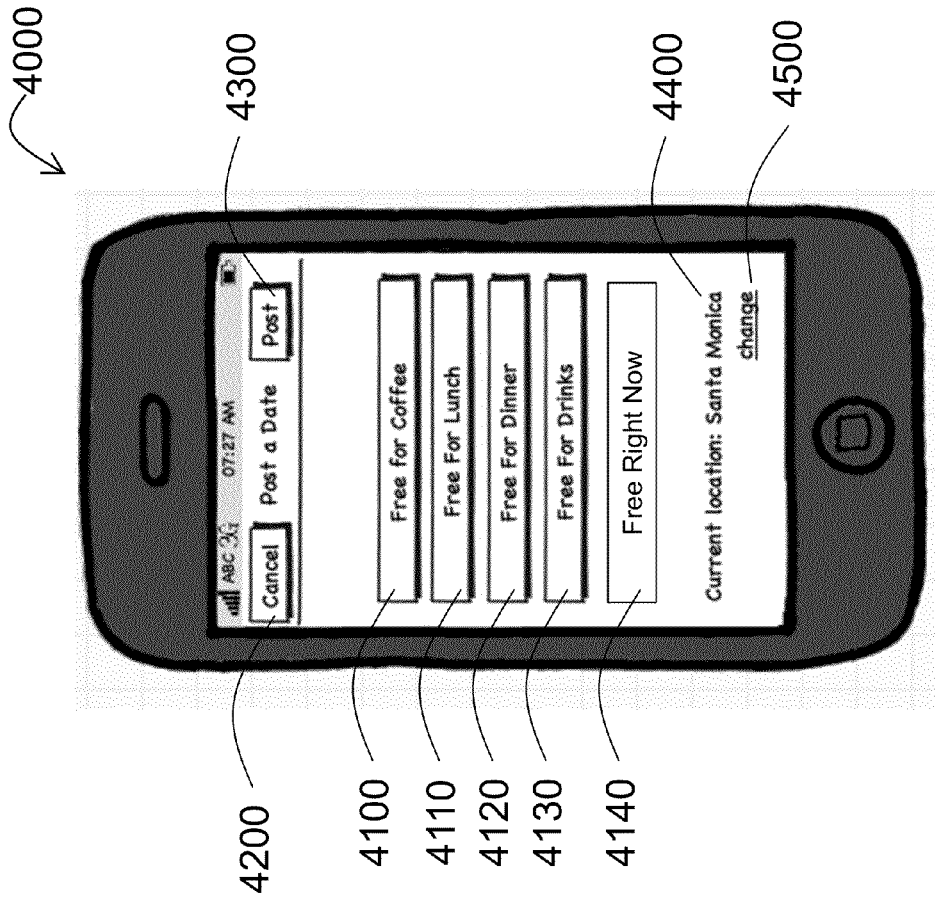
FIG. 4 is another exemplary user interface of the "I'm Free for a Date" application in accordance with a preferred embodiment of the present invention.

Turning to FIG. 4, the "Post a Date" button 3500 in FIG. 3 launches user interface 4000. From this user interface 4000, the user can select the time and type of date they're available for, e.g., Free for Coffee 4100, Free for Lunch 4110, Free for Dinner 4120, Free for Drinks 4130, and/or Free Right Now 4140. The user may select one or more of these options by selecting their displayed icons. Other types of dates may also be added. The matching application 1210 or the matching server system 1400 may require that a user who posts a date must also have a photo previously submitted for the user's match profile. The user may also be required to have completed other requirements, e.g., indicating what the user is passionate for, or looking for. The user's photo and other requirements may be submitted or set up by using the online matching service. The user interface 4000 also displays the geographic location 4400 of the user associated with the posted date, e.g., current location or expected location. This location may be included in the "I'm Free for a Date" announcement to other users. The user is presented with the option to change the user's location using the "change" function 4500. After the options are selected, the user may then post the date for announcement to other participating users (e.g., by selecting the "Post" button 4300) of matching server system 1400.

It is noted that, in one embodiment, the posted dates are announced to all users of the online matching service. In such an instance, users who are not compatible matches with the user may receive the announcement with an indication that the user is not compatible with them. In another embodiment, the posted dates may be announced only to the compatible matches of the user (e.g., as set forth in the Buckwalter patent), and/or to a set of selected users.

In the event that the user does not want to post the dates, the user may select the Cancel icon 4200. The user may also use the Cancel icon 4200 to cancel dates that the user has posted earlier.

After the date has been posted, the application 2160 returns the user back to the user interface 3000 shown in FIG. 3. This user interface 3000 may not only display the date(s) the user has posted, but also posted dates of other users, e.g., 3100/3200, participating in the location-based matching system 1000 via the "Posted Dates" 3600 button. Preferably, the results shown are not only based on whether the posted date 3200 is nearby the user's specified location (either current or expected location) but also based on whether the posted 3200 is associated with a potentially compatible user, as calculated (and optionally ranked) by the match engine 1430 in accordance with the techniques described in the Buckwalter patent. If the user is interested in accepting the posted date, e.g., 3200, then the user can press the "Interested" button 3400, which communicates interest to the user who posted the date, 3200. If a large number of posted dates 3200 are shown, then the user may elect the Filter 3440 option for certain desired characteristics, such as age, more refined distance (e.g., 1 mile vs. 5 miles away), etc. . . .

Figure 5:
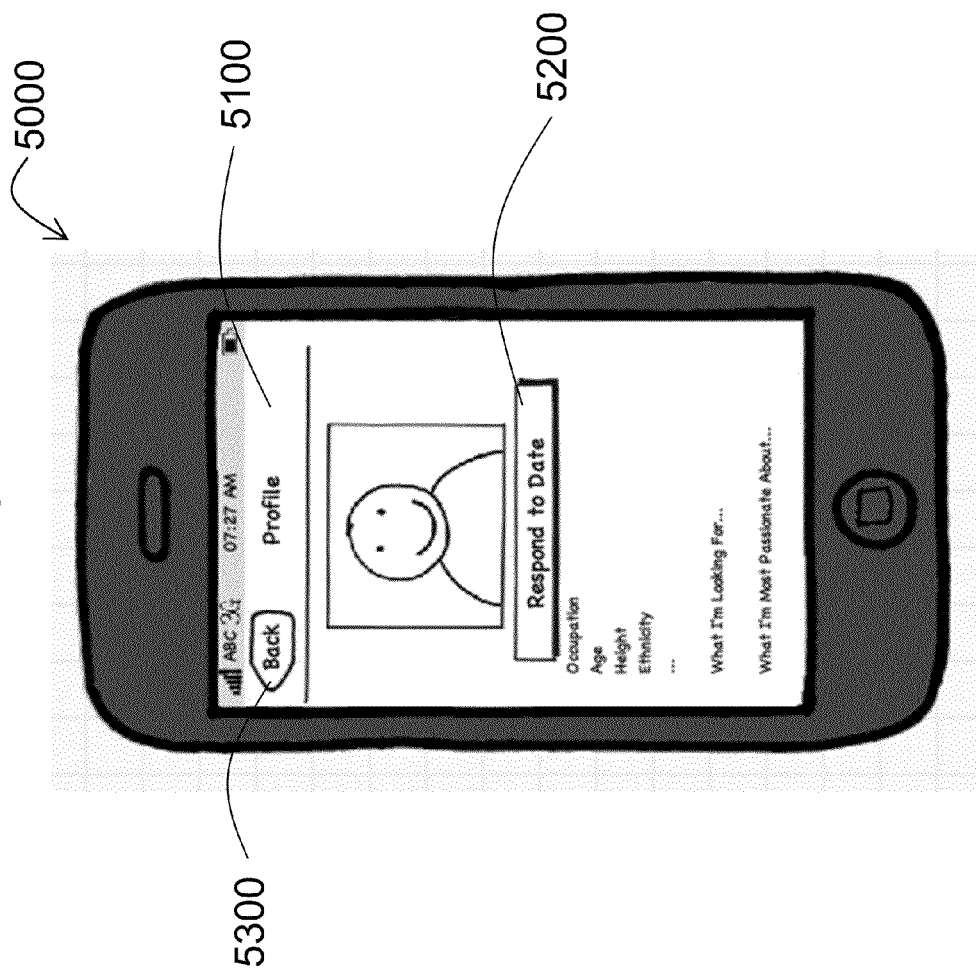
FIG. 5 is another exemplary user interface in accordance with a preferred embodiment of the present invention.

Turning to FIG. 5, a user interface 5000 on a user device 1200/1300 in accordance with a preferred embodiment is shown. If the user wishes to learn more about the user who posted a date 3200 (as shown in FIG. 3), the user interface 5000 is displayed for the selected posted date 3200. The profile 5100 of the poster (user who posted the date 3200) is displayed. The user may select the Respond to Date icon 5200, e.g., to enter a chat session with the poster, send a text message or an email to the poster. Or the user may select the Back icon 5300 to return to the user interface 3000 (FIG. 3).

Turning to FIG. 6, a user interface 6000 on a user device 1200/1300 in accordance with a preferred embodiment is shown. The user interface 6000 is displayed upon the user selecting the Respond to Date icon 5200 (FIG. 5) and a chat function is provided. The user interface 6000 provides a mechanism to enable the user to chat with the poster 6100 of a date. A portion 6200 of the user interface 6000 displays the chat messages between the user and the poster 6100. A virtual keyboard portion 6300 enables the user to type the chat messages. The same user interface 6000 may also provide the mechanism to enable other chat activities between the user and one or more users of the online matching service. Other similar user interfaces may also be displayed to enable the user to send a text message or an email to the poster.

Turning to FIG. 7, a user interface 7000 on a user device 1200/1300 in accordance with a preferred embodiment is shown. If the user has initiated a request to communicate with a user who posted a date 3200, the recipient of that request (i.e., the user who posted the date 3200) may be shown user interface 7000. Portion 7100 displays an identification, e.g., name, of the compatible match. The user may select the Chat icon 7200 to begin a chat session (e.g., FIG. 6) with the compatible match. Or the user may select the Ignore icon 7300, which exits user interface 7000. Other icons, e.g., send text message, may be added to enable the user to connect with the compatible match.

Preferred Processes

Turning to FIG. 8, a description of the operation 8000 of the matching server system 1400, in conjunction with the matching application 1210, is shown. Generally, as mentioned above, a user will rely on the matching server system 1400 and the matching application 1210 to post and/or view one or more "I'm Free for a Date" dates that may lead to a successful date with other potentially compatible users, e.g., as set forth in the Buckwalter patent.

Upon a user's activating the "I'm Free for a Date" application (FIG. 2) via the matching application 1210, the matching server system 1400 retrieves the user's profile data from the database 1410 and the user's current or expected geographic location from profile location database 1420 (Action Block 8100), e.g., as received from the user device 1200/1300 or via location identification server 1500. As mentioned above, alternatively, the profile data and the geographic location data can be stored in the same database. The matching server system 1400 then provides the retrieved data for display, via the matching application 1210, in the user interface 3000 at the user device 1200/1300 (Action Block 8200) as shown in FIG. 3.

To post a date, e.g., through the user interface 4000, the user can select one or more "I'm Free for a Date" date types. The selection(s) are received at the matching server system 1400 (Action Block 8300). The matching server system 1400 verifies that the user has satisfied all requirements for posting an "I'm Free for a Date" date (Action Block 8400), e.g., having a submitted photo, indicating what the user is passionate for, or is looking for. If the requirements have been met, the matching server system 1400 updates the user's profile data in the database 1410 and the user's geographic location in profile location database 1420 with the data received as part of the received selection(s) (Action Block 8500). The data may include, e.g., the "I'm Free for a Date" dates and times, and any change in the geographic location.

Turning to FIG. 9, a description of the operation 9000 of the matching server system 1400, in conjunction with the matching application 1210, is shown. The matching server system 1400 retrieves data, e.g., ID and location, of users whom the user of user device 1200/1300 has expressed interest in meeting and who have posted one or more "I'm Free for a Date" dates, from the database 1410 and the user's geographic location from profile location database 1420 (Action Block 9100). The matching server system 1400 then provides the retrieved data for display, via the matching application 1210, in the user interface 3000 at the user device 1200/1300 (Action Block 9200) as shown in FIG. 3. Preferably, the results are calculated (and optionally ranked) not only on distance between the users, but also compatibility calculated by matching engine 1430, in accordance with the approaches described in Buckwalter. Upon the user selecting a displayed selection, the selection is received at the matching server system 1400 (Action Block 9300). If the user selects one of the posted dates (Decision Block 9400), the matching server system 1400 retrieves the profile of the poster and provides the profile for display (Action Block 9500) as shown in FIG. 5.

At this point, upon the user selecting a displayed selection, the selection is received at the matching server system 1400 (Action Block 9600). If the user elects to respond to the posted date (Decision Block 9700), the matching server system 1400 may initiate a request to chat, or text message or email (Action Block 9800) to enable communication between the user who posted the date and the user interested in the posted date.

Turning to FIG. 10, a description of the operation 10000 of the matching server system 1400, in conjunction with the matching application 1210, is shown. When a user engages the location-based matching service 1400, the matching application 1210 retrieves/receives the geographic location information from the user, the user device's GPS functions and/or from the location identification server 1500. The matching application 1210 then sends the geographic location information to the matching server system 1400, which receives and stores the information in the profile location database 1420 (Action Block 10100). Either at a predetermined periodic interval, or in a continuous manner, the matching server system 1400 retrieves the profile data of the user (Action Block 10200). If the user has previously posted certain one or more matching interests (Decision Block 10300), the matching server system 1400 looks up in the profile database 1410 for other users with compatible profiles (e.g., as set forth in the Buckwalter patent) and/or profiles that include the same posted one or more interests, and queries the profile location database 1420 for the geographic location of these users (Action Block 10400). If one or more users are found with compatible profiles and/or the same posted one or more interests, and with a geographic location in the same predetermined proximity criteria with the user, the matching system server 1400 uses a push technology to send a message to the user device 1200/1300 with the information of one or more of the found users (Action Block 10500).

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions described herein is merely illustrative, and the invention may appropriately be performed using different or additional process actions, or a different combination or ordering of process actions. For example, this invention is particularly suited for interpersonal relationships; however, the invention can be used for any relationship in general. Additionally and obviously, features may be added or subtracted as desired. Accordingly, the invention is not to be restricted except in light of the attached claims and their equivalents.

What is claimed is:

1. A computer-based system for presenting the availability of one or more users, comprising:
   a matching server system, operatively coupled to a public network, having a database that stores profile data associated with a plurality of users, a database that stores geographic location data associated with the plurality of users, wherein the matching server system is configured to:
   receive a user's geographic location data;
   store the user's geographic location data in the database that stores geographic location data;
   retrieve the user's profile data from the database that stores profile data;
   if the user has a posted interest in the user's profile data, retrieve the user's geographic location data from the database that stores geographic location data, query the database that stores profile data for one or more other users whose profile data have the same posted interest, compatible profiles, and whose geographic location data indicate close proximity to the geographic location data of the user; and
   push the profile identification and the geographic location data of the one or more queried other users to a user device of the user;
   enable the user to selectively apply a filter to the profile data of the one or more queried users to reduce the number of one or more queried users' profile identification and geographic location data that is pushed to the user.

2. The computer-based system of claim 1, wherein the database that stores profile data associated with a plurality of users and the database that stores geographic location data associated with the plurality of users are the same database.

\* \* \* \* \*